(12) United States Patent
March

(10) Patent No.: US 7,033,113 B2
(45) Date of Patent: Apr. 25, 2006

(54) MID-LINE CONNECTOR AND METHOD FOR PIPE-IN-PIPE ELECTRICAL HEATING

(75) Inventor: David Martin March, Rijswijk (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/835,220

(22) Filed: Apr. 29, 2004

(65) Prior Publication Data
US 2005/0054228 A1    Mar. 10, 2005

Related U.S. Application Data

(60) Provisional application No. 60/467,084, filed on May 1, 2003.

(51) Int. Cl.
*F16L 53/00* (2006.01)
(52) U.S. Cl. .................................. 405/158; 405/154.1
(58) Field of Classification Search ............... 405/158, 405/154.1; 493/191–194
See application file for complete search history.

(56) References Cited

U.S. PATENT DOCUMENTS

| | | | |
|---|---|---|---|
| 6,142,707 A | 11/2000 | Bass et al. | 405/158 |
| 6,161,025 A | 12/2000 | Chiu | 455/565 |
| 6,179,523 B1 | 1/2001 | Langner et al. | 405/169 |
| 6,264,401 B1 | 7/2001 | Langner et al. | 405/169 |
| 6,292,627 B1 * | 9/2001 | Gilchrist, Jr. et al. | 392/311 |
| 6,315,497 B1 | 11/2001 | Wittman et al. | 405/158 |
| 6,371,693 B1 | 4/2002 | Kopp et al. | 405/158 |
| 6,509,557 B1 * | 1/2003 | Bass | 405/131 |
| 6,688,900 B1 * | 2/2004 | Bass et al. | 439/191 |
| 6,707,012 B1 * | 3/2004 | Stone, Jr. | 405/169 |
| 6,714,018 B1 * | 3/2004 | Bass | 324/525 |
| 2003/0015436 A1 | 1/2003 | Bass et al. | 205/740 |
| 2003/0015519 A1 | 1/2003 | Stone | 219/494 |
| 2003/0016028 A1 | 1/2003 | Bass | 324/642 |
| 2003/0017007 A1 | 1/2003 | Bass et al. | 405/154.1 |
| 2003/0020499 A1 | 1/2003 | Bass | 324/721 |

FOREIGN PATENT DOCUMENTS

| | | |
|---|---|---|
| JP | 57117000 | 7/1982 |
| SU | 1481553 | 5/1989 |

OTHER PUBLICATIONS

PCT Search Report dated Apr. 30, 2004.

* cited by examiner

*Primary Examiner*—Frederick L. Lagman
(74) *Attorney, Agent, or Firm*—William E. Hickman

(57) ABSTRACT

For heating a pipe-in-pipe pipeline with power provided through an electric cable, mid-line connector is provided including: a connector housing joinable to the outer pipe of the pipeline; a blank pipe positioned within the connector housing and joinable to the inner pipe of the pipeline; at least one pocket mounted in the connector housing, wherein the cable is mateable with the at least one pocket; a blank pipe conductor electrically coupled between the at least one pocket and the blank pipe; and an outer pipe conductor electrically coupled between the at least one pocket and the outer pipe.

20 Claims, 4 Drawing Sheets

MID-LINE CONNECTOR AND METHOD FOR PIPE-IN-PIPE ELECTRICAL HEATING

This application claims priority on U.S. Provisional Application No. 60/467,084, filed on May 1, 2003.

FIELD OF THE INVENTION

The present invention relates to electrical heating of subsea pipelines. More particularly the invention relates to electrical heating with a pipe-inside-pipe configuration and a connector to the pipes about midway between bulkheads at each end.

BACKGROUND OF THE INVENTION

Due to cool water temperatures (about 40° F. (4.4° C.)) in deep water offshore hydrocarbon recovery operations, hydrocarbon fluids flowing through subsea pipelines become very viscous or deposit paraffin when the temperature of the fluid drops, adversely affecting fluid flow in the pipeline. Hydrocarbon gas under pressure combines with water at reduced temperatures to form a solid material, called a "hydrate". Hydrates can plug pipelines and the plugs may be very difficult to remove.

One solution involves electrical heating of the subsea pipeline to prevent excessive cooling of the fluid hydrocarbons. Heating by a variety of electrical methods has been known. Two configurations for electrical heating have been considered. One configuration, called a Single Heated Insulated Pipe (SHIP) system uses a single, electrically insulated flowline with current passing along the flowline. Another configuration is called a pipe-in-pipe system (EHPIP).

An EHPIP subsea pipeline has a flow line or inner pipe for transporting well fluids which is surrounded concentrically by and electrically insulated from an electrically conductive outer pipe until the two pipes are electrically connected at one end. Voltage is applied between the inner and outer pipes at the opposite end and electrical current flows along the exterior surface of the inner pipe and along the interior surface of the outer pipe. This pipe-in-pipe method of heating is disclosed, for example, in U.S. Pat. No. 6,142,707, which is hereby incorporated by reference. U.S. Pat. Nos. 6,161,025, 6,179,523, 6,264,401, 6,292,627, 6,315,497, 6,371,693; and commonly owned patent applications titled "Annulus for Electrically Heated Pipe-in-Pipe Pipeline", Ser. No. 09/910,696; "Method of Installation of Electrically Heated Pipe-in-Pipe Subsea Pipeline", Ser. No. 09/910,678, Publication No. US2003/0017007A1; "Method for Commissioning and Operating an Electrically Heated Pipe-in-Pipe Subsea Pipeline", Ser. No. 09/910,622, Publication No. US2003/0020499A1; "Corrosion Protection of Electrically Heated Pipe-in-Pipe Subsea Pipeline", Ser. No. 09/910,489, Publication No. US2003/0015436A1; "Power Supply for Electrically Heated Subsea Pipeline", Ser. No. 09/910,625, Publication No. US2003/0015519A1; "Apparatus and Method for Electrically Testing of Electrically Heated Pipe-in-Pipe Pipeline", Ser. No. 09/910,295, Publication No. US2003/0016028A1, are all hereby incorporated by reference.

Referring to FIG. 1, the general concept a pipe-in-pipe heating segment 10 is illustrated. Flow pipe 12 is positioned concentrically within outer pipe 14, so that annulus 13 is defined between the pipes. Concentric pipes 12 and 14 are electrically isolated except at bulkheads 16, which are placed at each end of the selected segment 10 of pipeline to be heated. Electrical power supply 6 supplies voltage at a selected voltage and frequency (including Direct Current) between flow pipe 12 and outer pipe 14 to a selected point on the pipes. Typically, the electrical voltage is supplied to the heating segment 10 at the mid-point between bulkheads 16. However, voltage may also be supplied at a location offset from the mid-point between bulkheads 16, such that a difference in electrical impedance between each portion of the segment to be heated is taken into account (for example, to allow equal current flow in each portion of the heated segment, even though impedance is different) or to provide more power for heating in one portion of the selected segment. While voltage may be supplied anywhere, in this disclosure an electrical connector between bulkheads will be referred to as a "mid-line connector". Adjoining heating segments may be electrically heated. A single bulkhead between two heating sections may complete two electrical circuits, such that electrical current from both segments passes through the single bulkhead. The length of a heating segment may be from a few feet, for example about 50 feet (15.2 m), to 40 miles (64.4 km) or more, depending on the requirements for heating the pipeline. More typically, the length of heating segments range from about 1 mile (1.6 km) to about 10 miles (16.1 km).

Referring to FIG. 2, a system implementing a mid-line pipe-in-pipe electrically heated system is shown. A pipeline 2 is deployed normally thousands of feet below sea surface 1 having a first end near platform 3, a floating facility or other host facility, and having a second end on the sea floor 4. Platform 3 is anchored to sea floor 4. Riser 5 connects heating segment 10 to the top side of platform 3 or other facility. Riser 5 may also be heated using the pipe-in-pipe configuration, in which case it will be treated as a heating segment 10 of the pipeline 2. Electrical generator 6 is supported on platform 3, among other equipment. Electrical generator 6 is connected electrically by cable 7 to mid-line connectors 20. Heating segments 20 are separated by bulkhead 16.

In typical pipe-in-pipe methods of heating, the total voltage drop is maintained at the power supply-end of the pipe segment to be heated. The voltage drop at the power input end of a heated segment determines the amount of heating available and the length of a segment that can be heated. Voltage drop is limited by the dielectric strength and thickness of electrical insulation available. A configuration for minimizing voltage required with the pipe-in-pipe method is needed. Also, there is a need for an apparatus and method that allow heating selected segments of a pipeline that is heated by the pipe-in-pipe method.

A pipe-in-pipe mid-line connector is needed which may be connected to the electrical cable after the pipe-in-pipe is deployed to the sea floor. A pipe-in-pipe mid-line connector is also needed which provides relative axial movement between the flow pipe and the outer pipe to avoid structural failures. During deployment, the pipe-in-pipe pipeline must endure bending stresses and tensile stresses which are significant. A mid-line connector is needed which enables flexibility between the flow pipe and the outer pipe but also enables both the flow pipe and the outer pipe to share the tensile loads. A mid-line connector which reduces local heating caused by poor contact resistance is also needed. Further, there is a need for a mid-line connector which protects the flow pipe from local corrosion and build-up of oxidation particles within the mid-line connector. Because mid-line connector may be electrically unused for long periods of time, a mid-line connector which will not allow its electrical contacts to become corroded is needed. Because mid-line connectors are the electrical power supply points for pipeline heating segments, a mid-line connector which controls stray current effects on the mid-line connector is needed. Still further, a pipe-in-pipe system is needed which immobilizes intra pipe movement between the flow pipe and the outer pipe.

SUMMARY OF THE INVENTION

The present invention involves a variety of mid-line connectors for pipe-in-pipe pipelines. More specifically, a connector of an electrical cable to a pipe-in-pipe pipeline, wherein the pipeline comprises an inner pipe and an outer pipe, said connector comprising:

a connector housing joinable to the outer pipe of the pipeline;

a blank pipe positioned within said connector housing and joinable to the inner pipe of the pipeline;

at least one pocket mounted in said connector housing, wherein the cable is mateable with the at least one pocket;

a blank pipe conductor electrically coupled between the at least one pocket and the blank pipe; and an outer pipe conductor electrically coupled between the at least one pocket and the outer pipe.

The mid-line connector may be connected easily to a power generator with an electric cable. The mid-line connector may have an electrically conductive flexible inner pipe connection which enables relative movement between the inner pipe and the outer pipe. The mid-line connector may have a layer of copper coating on the inner pipe where the electric conductor is connected to the inner pipe so as to reduce local hating caused by poor contact resistance. The mid-line connector may also have a moisture control protective layer coated on the exterior of the inner pipe to prevent the inner pipe from oxidation, corrosion and/or build up of oxidation particles. The mid-line connector may be capable of high axial loading. The mid-line connector may also be equipped with dummy plugs to prevent electrical couplers from decay. The mid-line connector may be oriented when placed on the sea floor so that electrical couplers are easily accessible on top of the mid-line connector. The mid-line connector may also have its exterior surfaces deliberately left bare so that potential difference may exist over a large surface area, preventing localized accumulation of stray current. The mid-line connector may also have inner and outer body configurations adaptable to different flowline diameters without modifying shape, strength, or geometry of the connector. The pipe-in-pipe heating system may also have foam in an annulus between the pipes to prevent relative movement between the pipes.

According to one aspect of the invention, there is provided a connector of an electrical cable to a pipe-in-pipe pipeline, wherein the pipeline has an inner pipe and an outer pipe, the connector having several parts including: a connector housing joinable to the outer pipe of the pipeline; a blank pipe positioned within the connector housing and joinable to the inner pipe of the pipeline; at least one pocket mounted in the connector housing, wherein the cable is mateable with the at least one pocket; a blank pipe conductor electrically coupled between the at least one pocket and the blank pipe; and an outer pipe conductor electrically coupled between the at least one pocket and the outer pipe.

According to another aspect of the invention, there is a heated pipe-in-pipe pipeline and cable system having: an outer pipe; an inner pipe concentric within the outer pipe and forming an annulus between the pipes; a connector including several parts: a connector housing joined to the outer pipe, a blank pipe positioned within the connector housing and joined to the inner pipe, at least one pocket mounted in the connector housing, wherein the cable is mated with the at least one pocket, a blank pipe conductor electrically coupled between the at least one pocket and the blank pipe, and an outer pipe conductor electrically coupled between the at least one pocket and the outer pipe; and a bulkhead electrically connecting the outer pipe to the inner pipe.

A further aspect of the invention is a method for heating a pipe-in-pipe pipeline with steps including: placing on a sea floor a pipe-in-pipe pipeline comprising a mid-line connector and an electrically conductive bulkhead; removing a dummy plug from the mid-line connector; mating a cable with the mid-line connector; and supplying electric power to the mid-line connector through the cable. In some embodiments, the bulkhead is made of steel and is joined to the flow pipe and the outer pipe.

Another aspect of the invention is a mid-line connector for a pipe-in-pipe heating system, wherein the mid-line connector housing has bare exterior surfaces and a sacrificial electrode.

A further aspect of the present invention is a mid-line connector for a pipe-in-pipe heating system, wherein a blank pipe of the mid-line connector has a blank pipe for connection to the flow pipe with an electrically conductive coating on an exterior surface proximate a couple location of a blank pipe electrical conductor to the blank pipe and a corrosion protective coating on an exterior surface.

While there are many aspects of the invention, one aspect is a mid-line connector for a pipe-in-pipe heated pipeline wherein an interior compartment of the mid-line connector which houses electrically conductive components is completely sealed to prevent sea water penetration.

Still another aspect of the invention is a mid-line connector equipped with dummy plugs in electric couplers or pockets to prevent deterioration of the couplers or pockets during periods of electrical inactivity.

According to another aspect of the present invention, there is provided a mid-line connector for a pipe-in-pipe heating system, wherein the connector has two wet-mateable electric coupler devices which are mounted to the mid-line connector housing in directions opposite to each other and parallel to the longitudinal axis of said connector housing.

BRIEF DESCRIPTION OF THE DRAWINGS

The present invention is better understood by reading the following description of non-limitative embodiments with reference to the attached drawings wherein like parts of each of the several figures are identified by the same referenced characters, and which are briefly described as follows.

It is to be noted, however, that the appended drawings illustrate only typical embodiments of this invention and are therefore not to be considered limiting of its scope, as the invention may admit to other equally effective embodiments.

DETAILED DESCRIPTION OF THE INVENTION

Figure 3:
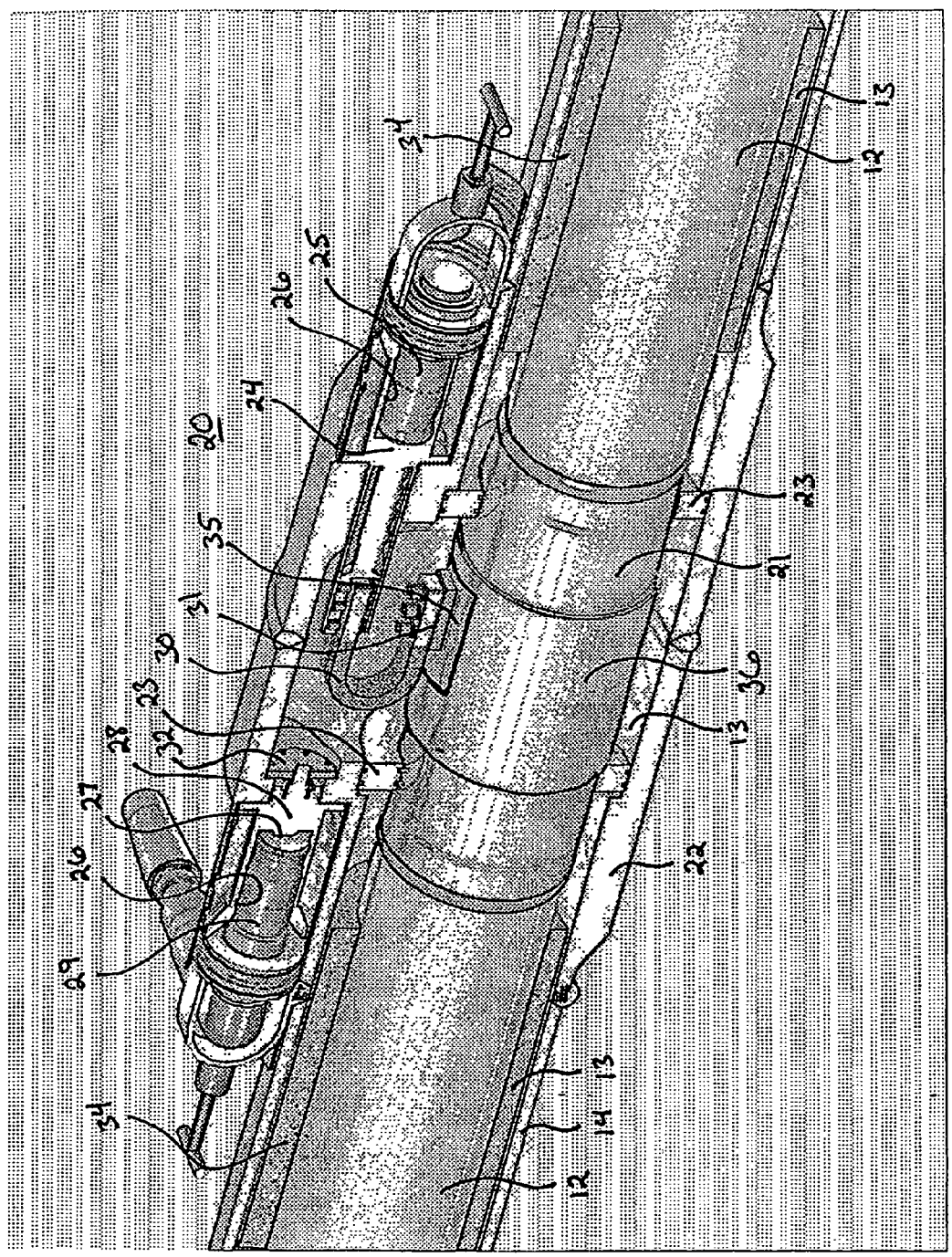
FIG. 3 is a cut-away, perspective view of a mid-line connector of the present invention with connection pockets aligned with the longitudinal axis of the pipeline, and electrical connections to the inner and outer pipes of the pipelines.

Referring to FIG. 3, a perspective view of an embodiment of a mid-line connector of the present invention is illustrated. The mid-line connector 20 is inserted into a heating segment 10 of a pipeline 2 between adjacent pipe sections of the pipeline 2. Adjacent sections of the flow line 12 are connected to each other by a blank pipe section 21 which is welded to the ends of the adjacent sections of the flow pipe 12. The adjacent sections of the outer pipe 14 are connected to each other by a connector housing 22 which is welded to the sections of the outer pipe 14. As previously described, an annulus 13 is defined between the flow pipe 12 and the outer pipe 14. This annulus is similarly defined between the blank pipe section 21 and the connector housing 22. Spacer rings 23 may be positioned in the annulus 13 to ensure proper distance is maintained between the blank pipe section 21 and the connector housing 22. The spacer rings 23 may be non-conducting centralizers which maintain the inner pipe concentric to the outer pipe and to electrically insulate the pipes from each other. Some embodiments of the invention have non-conducting "shear stops" or "water stops" placed at selected intervals in the annulus. Shear stops are commonly plastic material. Water stops may be used to prevent complete water flooding of the annulus in the event of a breach in the outer pipe or other components of the pipe-in-pipe system. In the embodiment shown, the spacer rings 23 form a seal between the blank pipe section 21 and the connector housing 22 to prevent sea water penetration into the inner compartment of the mid-line connector.

The outer pipe of the pipeline may be thermally insulated to minimize heat loss and to reduce the amount of electrical current necessary to heat the contents of the pipe. Similarly, outer surfaces of the connector housing may be thermally insulated. In the pipe-in-pipe pipeline the outer surface of the flow pipe may be provided with an electrically insulating coating, for example, a fusion bonded epoxy. Such coating, when applied with an appropriate thickness, such as 20 mils (0.51 mm) or more, can withstand up to 8000 volts before failing, even after being wetted for several days. The flow pipe may also have a thermally insulating layer and perhaps even a co-extruded solid skin outer surface which protects the insulating layer. The solid skin may be a water barrier to protect the insulating layer if its is porous and provides an additional layer of electrical insulation. Similarly, the blank pipe section 21 of the mid-line connector may also have these noted layers and coatings.

Intra pipe movement between the flow pipe 12 and the outer pipe 14 may be entirely immobilized using a man made syntactic foam 34 or similar curing foam 34 that is poured in place after assembly of the mid-line connector 20. In one embodiment, the foam 34 is a two-part syntactic foam insulation (epoxy resin, s.g 0.76) containing glass microsphere filler that is a pour-in-place between the centralized blank pipe section 21 and connector housing 22. custom jigs may be employed to guarantee centralization and prevention of creep during the pouring or curing activity. Atmospheric conditions are controlled for optimal curing results and the mobilization of maximum shear capacity. The foam 34 acts as an intra pipe shear stop. Foams acceptable for this purpose have high insulating capacity for the flow pipe contents, low water absorption characteristics, a resistance to charring and short circuit due to arcing across the surface. Foam properties should be verified before a particular foam is used to guarantee the effectiveness and reliability of the selected material, as is known to those of skill in the art. In one embodiment, the foam average delivered shear stress for this application is in the range of 180 to 200 psi (1.24–38 mpa). Quality of selected materials should be useful for installation in the marine environment, variances in recipe and capable of adherence to bare gritblasted steel and coated steel surfaces with epoxy based paints or other similar protective coverings. Methods of centralizing the flow pipe 12 in the outer pipe 14 are carefully controlled to maintain concentricity and thereby continue to deliver the alignment of flow pipe 12 and the outer pipe 14 for welding.

Figure 1:
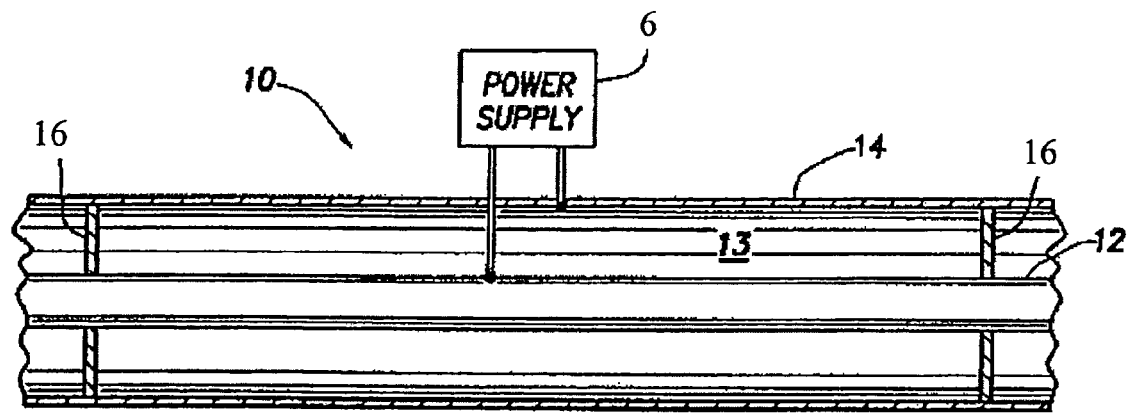
FIG. 1 is a cross-sectional, side view of a heating segment of a pipeline.
Figure 2:
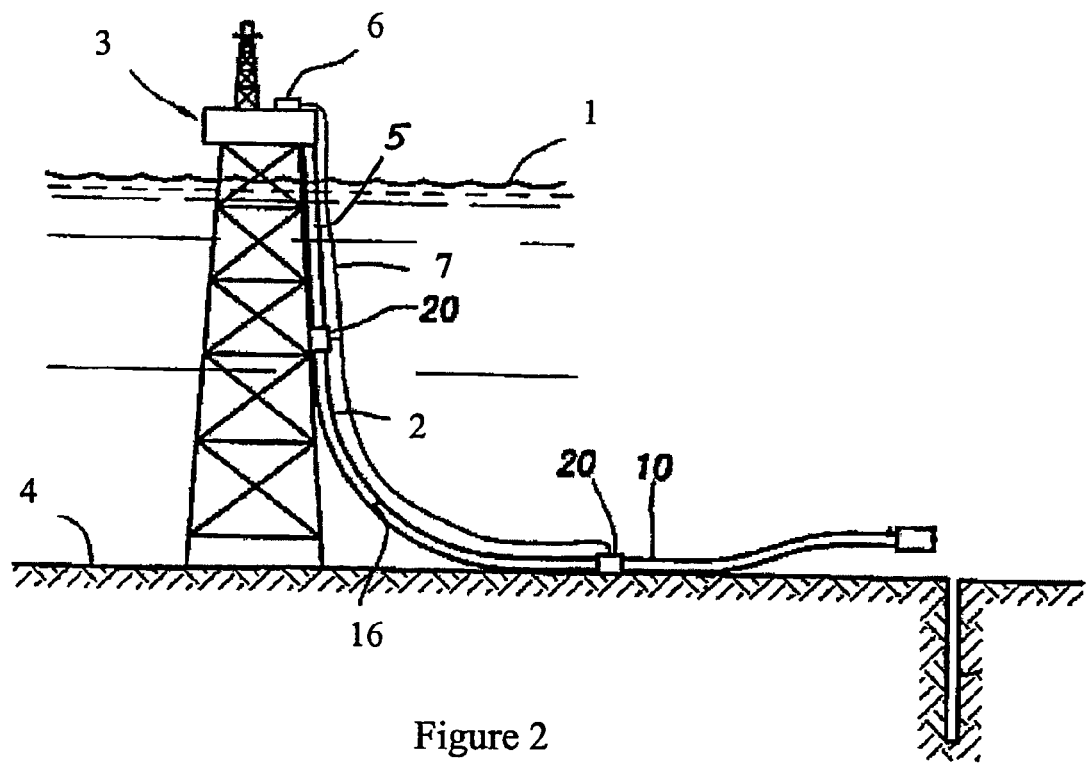
FIG. 2 is an illustration of an offshore application of a pipe-in-pipe heated pipeline with mid-line connectors.

The connector housing 22 also has a flow pipe connection pocket 24 and an outer pipe connection pocket 28. In the embodiment shown, the connection pockets 24 and 28 are wet mate receptacles. The connection pockets 24 and 28 are female electrical couplers into which male couplers are inserted to establish electrical communication between a cable 7 (see FIG. 2) and the mid-line connector 20. A dummy plug 25 is shown inserted into the flow pipe connection pocket 24. A live plug 29 is shown inserted into outer pipe connection pocket 28. Dual elastomeric seals are positioned on the inside of the connection pockets to form a seal between the connection pockets and the plugs upon insertion. Electric leads 27 are located at the distal ends of the plugs for mating with leads in the bottoms of the connection pockets.

The flow pipe connection pocket 24 is electrically coupled to the blank pipe section 21 by a braided strap 30. One end of the braided strap 30 is bolted to the flow pipe connection pocket 24, and the other end is bolted to the blank pipe section 21 by a connection block 31. The outer pipe connection pocket 28 is electrically coupled to the connector housing 22 by a connection disc 32 mounted in the connector housing 22 proximate the outer pipe connection pocket 28.

A copper coating 35 is also affixed to the exterior of the blank pipe section 21 in the vicinity of the connection with the braided strap 30. A moisture control coating 36 is also affixed to the blank pipe section 21 in the vicinity of the connection with the braided strap 30. The surface area covered by the moisture control coating 36 is greater than the surface area covered by the copper coating 35.

Figure 4:
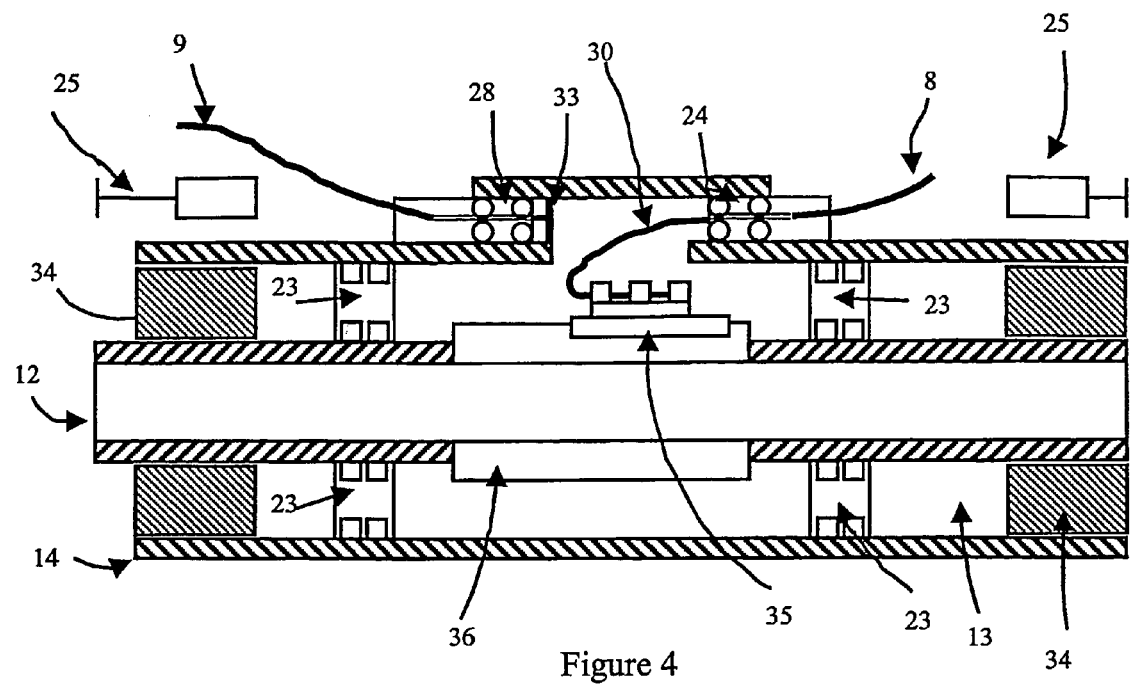
FIG. 4 is a cross-sectional, side view of a mid-line connector of the present invention with connection pockets, electrical connections to the inner and outer pipes of the pipelines, coatings on the inner pipe, and seals in the annulus between the pipes.

In an embodiment of the invention, the flow pipe connection is coated with a layer of copper spray 35 (see FIGS. 3 and 4). The purpose of the copper spray 35 is to reduce local heating caused by poor contact resistance. Local heating, caused by contact resistance (changes in section and shape of electrical conducting materials), is a measured and understood condition that is controlled to protect non-metallic parts in the connector cavity and the wet mateable connections from overheating. Localized overheating of non-metallic components is defined as temperatures above 250 degrees F. (121 degrees C.). The purity of the copper spray is monitored as part of the process. In one embodiment, a copper layer approximately 15 mls (0.381 mm) thick is adhered to the outside surface of the blank pipe section covering an area about 3 inches (7.6 cm) in all directions around the connection block 31 and over the connection block 31.

The connector housing 22 is made of two sections which are welded together during the assembly process. Each of the two sections has a cylindrical pipe section the same diameter as the outer pipe of the pipe-in-pipe pipeline, a larger pipe section, and a taper or conical section which joins the different sized pipe sections. The blank pipe section 21 and the connector housing 22 are butt welded to the flow pipe 12 and outer pipe 14. Any means known to those of skill in the art for connecting pipe sections may also be used.

The mid-line connector 20 may consist of an outer body forging and an inner body forging. The inner body forging may be a carbon steel component (ASTM A694) and the flow pipe may be API 5L X70. The blank pipe section 21 is made identical to the flow pipe bore allowing routine pigging operations. The diameter of the outer body forging is selected to accommodate the two electrical connection points or connection pockets 24 and 28. The electrical connection points may be sub-assemblies that are installed with mechanical fasteners and include dual elastomeric seals 26. Redundancy in sealing arrangements is a conventional engineering practice, however in this application, the assembly procedure is simple and modular using this technique. The seals may be selected for field life and durable to operating conditions (40 degrees F. to 250 degrees F.; 4.5 degrees C. to 121 degrees C.) on the seafloor. The inner body forging and outer body forging are designed for simplicity in connection to the adjacent flowline pipe using butt welds or full penetration pressure containing welds. The mid-line connector is normally deployed within the pipeline 2 and affixed by annular welding and non-destructive examination of the welds on an installation vessel before deployment.

Referring to FIG. 4, a side cross-sectional view of an embodiment of a mid-line connector of the present invention is shown. The flow pipe 12 extends through the inside of the connector 20, while the outer pipe 14 comprises the exterior of the connector 20. Foam 34 fills the annulus 13 between the flow pipe 12 and the outer pipe 14. Spacer rings 23 also stabilize the pipes relative to each other and seal the interior of the housing. In one illustrative embodiment of the invention, the end of the cable 7 (see FIG. 2) has two electrical cables carrying an electrical supply from the electrical power supply 6. The cable 7 (see FIG. 2) splits into branch cables 8 and 9 for insertion into the flow pipe connection pocket 24 and the outer pipe connection pocket 28, respectively. The flow pipe connection pocket 24 is electrically coupled to the flow pipe 12 by strap 30. The power is energized after both connections are made to the pipe-in-pipe heating segment 10 through two separate electrical leads inserted into the mid-line connector 20.

The connection between the cable 7 and the mid-line connector 20 may be made by a single remotely operated vehicle (ROV) equipped with two manipulator arms. Each connection is gripped in a manipulator using an ROV interface handle. Interface handles are commonplace to the subsea intervention industry and vary to suit the vehicle type on station. The cable may be buoyed so that it is more easily accessed by the ROV. By definition, wet-mate connectors enable underwater connection by ROV as a routine task. The wet-mate connector aligns the plug using a guiding barrel and protects a central power conduction pin. During the plug travel the power conducting surfaces are wiped clean of moisture by two seals combined with a pressure compensated oil filled chamber where a conducting shuttle pin comes to rest in the plug. The plug is held in place using two spring loaded latches riding against detents. Plug rotation is limited by a key and corresponding keyway in the wet-mate connector.

Figure 6:
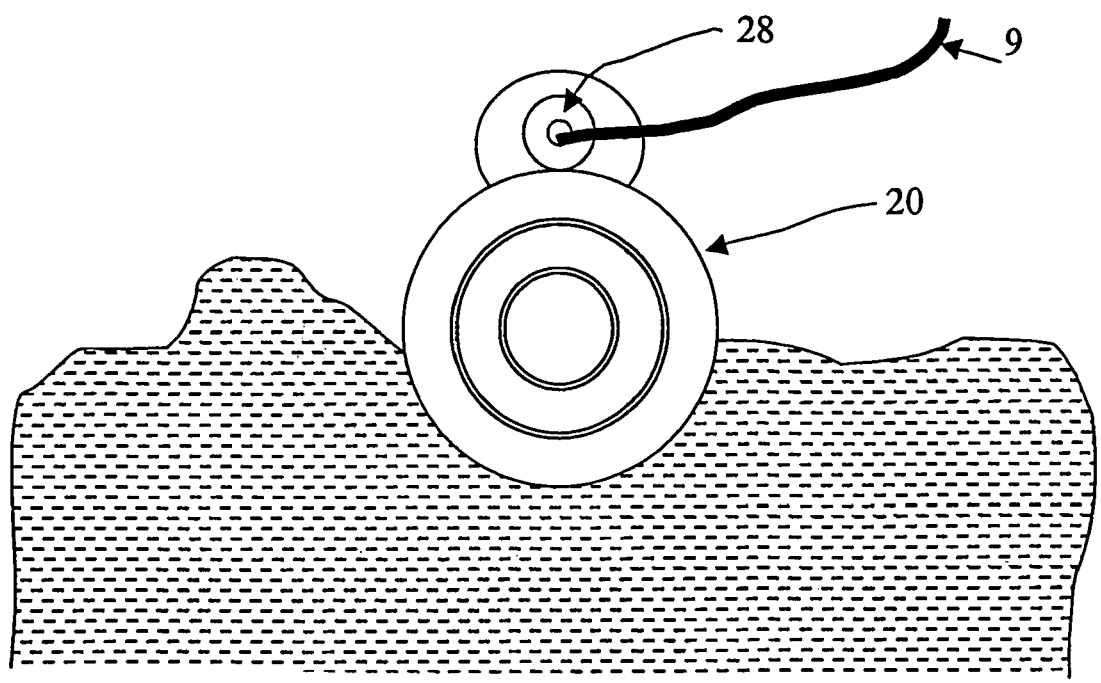
FIG. 6 is an end view of a mid-line connector placed on a sea floor and oriented with the connection pockets toward the top of the connector.
Figure 7:
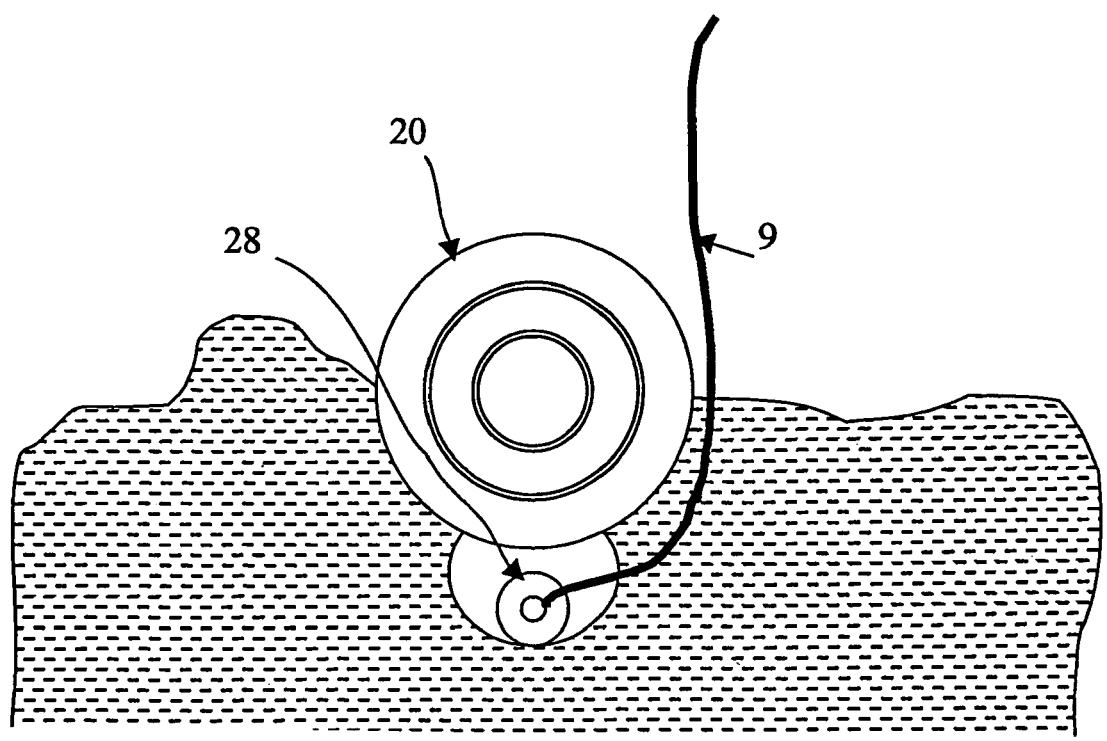
FIG. 7 is an end view of a mid-line connector placed on a sea floor and oriented with the connection pockets toward the bottom of the connector.

The mid-line connector is deployed such that it arrives on the seabed with the connection pockets in the top position, clear from the seafloor and accessible by the ROV, as shown in FIG. 6. If for some inadvertent reason, e.g., residual pipe bending, curvature of the flowline, the mid-line connector 20 is laid down with a different orientation (see FIG. 7), the connection pockets can still be successfully made by an ROV submarine. In some applications of the invention, it is a matter of random deposition on the sea floor 4, so that the ROV should be capable of connecting the cable 7 to the mid-line connector 20 regardless of its orientation. This is accomplished by excavation of the seabed material locally through dredging equipment attached to the ROV or any other method known to those of skill in the art.

Dummy plugs 25 are illustrated in FIGS. 3 and 4. In embodiments of the invention using wet-mateable connections, connection pockets 24 and 28 may be protected from the marine environment over the life of field by long term dummy plugs 25. A typical life of field is 20 years with the electrical connection lying on the seafloor. Dummy plugs prevent calcareous type deposition on the conducting surfaces of the wet-mateable connector, particularly the silver plate on a central conducting pin. The long term dummy plugs 25 are equipped with two wiping seals 26 and encapsulate the critical electrical contact pin in an oil filled chamber, as noted above. In some applications it is advantageous to protect the pins and surfaces. This is particularly true during long dormant periods of no heating activity. While dummy plugs are illustrated, any structural feature may be used to maintain the integrity of the electrically heated pipe-in-pipe system. Different embodiments of the invention use wet-mateable and dry-mateable connections to the mid-line connector. Dry-mateable connections to the cable are made before the pipeline is deployed to the sea floor.

In the embodiments of the invention illustrated in FIGS. 3 and 4, the connection pockets 24 and 28 face out in a horizontal aspect in parallel with the axis of the flow pipe 12. This orientations enables a minimum pipe swelling overall diameter. The principle of maintaining electrical isolation between the pipes is respected by the details of this connection device. The also enables easier access to the connection pockets by the ROV.

In some embodiments of the invention, the connection of electrical power to the flowline is made in an underwater environment at great depth, up to 6300 feet (1920 meters), or even as great as 8700 feet (2652 meters). Electrical couplings which join the cable 7 (see FIG. 2) to the mid-line connector 20 (see FIGS. 3 and 4) may be wet-mateable devices. Any electrical couplings suitable for underwater applications may also be used. The electrical couplings may be designed for rated current and voltage and provided as sub-assemblies for insertion into the connection assembly. Depending upon the particular subsea environments, the electrical couplings may be designed for use in thousands of feet of water.

In some embodiments of the invention, the flow pipe connection pocket carries the delivered single phase alternating current and voltage to the flow pipe. This connection is subjected to voltage up to 1200 volts and single phase alternating current up to 1100 A. The flow pipe connection consists of a welded block with bolt fastenings. The bolt fastenings hold a copper braided strap in place 30, in a compliant 'U' shape. The copper braided strap 30 connects between the wet-mateable electrical connection and the flow pipe. The configuration of the strap enables some axial movement of the pipe during heating. The copper braided strap 30 may be covered in a protective jacket to prevent any inadvertent damage during welding up of the unit.

In some embodiments of the invention, the blank pipe section 21 is coated with a moisture control seal 36 (see FIGS. 3 and 4) or other protective coating on its external surface to protect the surface from local corrosion and build-up of oxidation particles in the cavity. In some embodiments, the coating 36 is a 12–15 mils (0.30 mm–0.38 mm) coat of epoxy paint. The coating 36 serves to keep the blank pipe section 21 clean and dry during the assembly process and during operation. The coating 36 should maintain its integrity even though surfaces may reach temperatures of 250° F. (121° C.) during electrical heating operations. Some embodiments of the invention include non-metallic spacer rings 23 with seals to prevent moisture collection or contamination of the electrified compartment or spaces.

The mid-line connector 20 is some embodiments of the invention is a robust structural assembly suitable for launching from an installation vessel, with typical loads up to and including 400 US tons (362.9 tonne) in 6000 ft (1829 meters) of water depth.

The design of the mid-line electrical connector is such that the inner and outer body can be adapted to different flow pipe diameters without changing the shape, strength, or the geometry of the electrical connections and their individual attachment to the flow and outer pipes. The use of concentric metallic reducers may be employed to adapt the diameter of the electrically heated flow pipe. Typical combinations include 6 inch pipe inside 10 inch pipe, 8 inch pipe inside 12 inch pipe, and 10 inch pipe inside 16 inch pipe (15.24 cm pipe inside 25.4 cm pipe, 20.32 cm pipe inside 30.48 cm pipe, and 25.4 cm pipe inside 40.64 cm pipe). Other combinations are also possible. Larger diameters of pipe require higher levels of current and voltage delivery to create the heating effect. Metallic reducers may be employed to achieve the adaptability of the mid-line connector. The reducers may be substantially joined into the flow pipe using full butt welded connections and proven by non-destructive examination methods and further by externally applied proof pressure test.

Typically, the exterior surfaces of subsea pipelines are coated with an environmental barrier. Environmental barriers may comprise more than one sublayer, each of which may optionally be directed toward a particular environmental protective function, e.g., abrasion resistive material, tear resistant material, water and moisture proof material, stray current protective material, thermal protection material, or chemical protection material. Polyethylene, with an encasement standard of 800 v/mil dielectric resistance, is a good example of a stray current protective material for pipelines. In some embodiments of the invention, the outer surfaces of the mid-line connector are similarly covered with a stray current protective material. However, in real-world conditions, a defect-free bonded coating is impossible to economically obtain. Where voids or "holidays" caused by application errors or by installation damage exist, corrosion will take place. If bimetallic or stray current corrosion conditions exist, localized corrosion will be accelerated at the holidays, causing corrosion failure faster at the discrete point of holiday than if no coating had been applied to the pipeline. Accelerated corrosion results because the corrosion forces are cumulated at the discrete area of holiday, rather than being distributed along a more substantial surface area of the pipeline.

Figure 5:
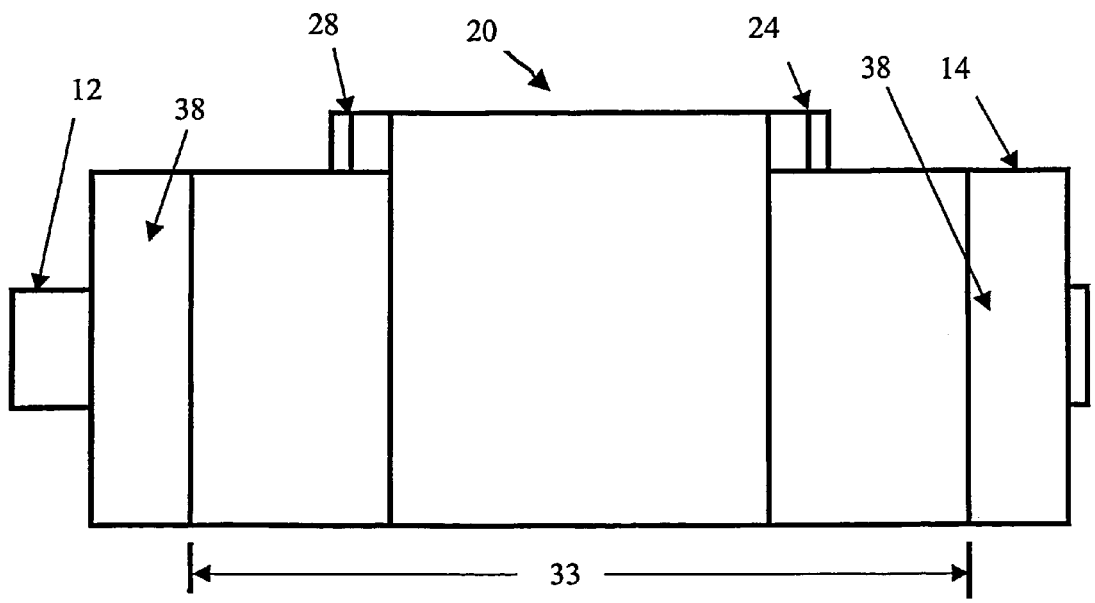
FIG. 5 is a side view of a mid-line connector of the present invention having bare external surfaces.

Referring to FIG. 5, a side view of the outside of a mid-line connector 20 of the present invention is shown. In this embodiment, outside surfaces of mid-line connector are deliberately left exposed. The bare area of the mid-line connector, i.e., an area without any coating over the metal, is provided to serve as a discharge electrode. The area of the discharge electrode or the bare housing is selected to decrease current density from seawater to the area of the heated segment where leakage current leaves or enters the mid-line connector. The outside surfaces are bare over a distance 33 such that during electrical heating activity, the phenomena of stray current may be accommodated by the larger surface area of steel over which potential difference could exist. For a given pipe diameter of 16 inches (40.64 cm), the distance 33 of exposed surface is about 6 feet–9 feet (1.83 m–2.74 m). A stray current protective material 38 is adhered to the exterior of the connector housing 22 and/or outer pipe 14 in areas not deliberately left bare. While the outside surface is deliberately left bare or exposed for heating, it may be protected from normal conditions of ferrous material in seawater, using sacrificial anodes attached to the mid-line connector adjacent to the midpoint and sized for the life of field. In some cases, the sacrificial anode is sized for 20 years of flowline operation. The current density is decreased to a value that provides corrosion rates not greatly affected by the current flow through the surface of the sacrificial electrode or bare mid-line connector. The required area of the sacrificial electrode or bare mid-line connector may be estimated from calculations of current density at different values of electric field along the pipeline and calculations or measurements of electric field near the ends of the heated segment of the pipeline, along with results of measurements of corrosion rates versus current density. Measurements of electric field along the pipeline are preferably made for the pipeline to be used.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A connector of an electrical cable to a pipe-in-pipe pipeline, wherein the pipeline comprises an inner pipe and an outer pipe, said connector comprising:
   a connector housing joinable to the outer pipe of the pipeline;
   a blank pipe positioned within said connector housing and joinable to the inner pipe of the pipeline;
   at least one pocket mounted in said connector housing, wherein the cable is mateable with the at least one pocket;
   a flexible blank pipe conductor electrically coupled between the at least one pocket and the blank pipe; and
   an outer pipe conductor electrically coupled between the at least one pocket and the outer pipe;
   wherein the flexible blank pipe conductor is adapted to provide relative axial movement between the inner pipe and the outer pipe.

2. A connector as claimed in claim 1, wherein said connector housing comprises a bare exterior surface and a sacrificial electrode.

3. A connector as claimed in claim 1, wherein said blank pipe comprises a electrically conductive coating on an exterior surface proximate a couple location of said blank pipe conductor to the blank pipe.

4. A connector as claimed in claim 1, wherein said blank pipe comprises a corrosion protective coating on an exterior surface.

5. A connector as claimed in claim 1, wherein said at least one pocket comprises a dummy plug.

6. A connector as claimed in claim 1, wherein said at least one pocket comprises two pockets, wherein a lead of the cable is mateable with each of the two pockets.

7. A connector as claimed in claim 6, wherein said two pockets comprise wet-mateable devices.

8. A connector as claimed in claim 6, wherein said two pockets are mounted to the connector housing in directions opposite to each other and parallel to the longitudinal axis of said connector housing.

9. A connector as claimed in claim 1, wherein said blank pipe conductor comprises a flexible strap.

10. A connector as claimed in claim 1, further comprising at least one ring in an annulus between said blank pipe and said connector housing, wherein said at least one ring seals the interior of the connector housing from the annulus.

11. A connector as claimed in claim 1, further comprising foam in an annulus between said blank pipe and said connector housing.

12. A heated pipe-in-pipe pipeline and cable system comprising:
    an outer pipe;
    an inner pipe concentric within said outer pipe and forming an annulus between the pipes;
    a connector joined to said outer and inner pipes comprising:
        a connector housing joined to said outer pipe;
        a blank pipe positioned within said connector housing and joined to said inner pipe;
        at least one pocket mounted in said connector housing, wherein the cable is mated with the at least one pocket;
        a flexible blank pipe conductor electrically coupled between the at least one pocket and the blank pipe; and
        an outer pipe conductor electrically coupled between the at least one pocket and the outer pipe, and
    a bulkhead electrically connecting said outer pipe to said inner pipe;
    wherein the flexible blank pipe conductor is adapted to provide relative axial movement between the inner pine and the outer pipe.

13. A system as claimed in claim 12, wherein said connector housing comprises a bare exterior surface and a sacrificial electrode.

14. A system as claimed in claim 12, wherein said blank pipe comprises an electrically conductive coating on an exterior surface proximate a couple location of said blank pipe conductor to the blank pipe and a corrosion protective coating on an exterior surface.

15. A system as claimed in claim 12, wherein said blank pipe conductor comprises a flexible strap.

16. A system as claimed in claim 12, further comprising a seal between the annulus and an interior of the connector.

17. A system as claimed in claim 12, wherein said at least one pocket comprises a dummy plug.

18. A system as claimed in claim 12, wherein said at least one pocket comprises two wet-mateable devices, wherein a lead of the cable is mateable with each of the two wet-mateable devices, wherein said wet-mateable devices are mounted to the connector housing in directions opposite to each other and parallel to the longitudinal axis of said connector housing.

19. A method for heating a pipe-in-pipe pipeline, said, method comprising:
    placing on a sea floor a pipe-in-pipe pipeline comprising a mid-line connector and an electrically conductive bulkhead, the mid-line connector comprising a flexible conductor;
    protecting an electrical connection pocket of the mid-line connector from contact with sea water;
    mating a cable with the protected electrical connection pocket of the mid-line connector; and
    supplying electric power to the mid-line connector through the cable;
    wherein said pipe-in-pipe pipeline comprises an inner pipe and an outer pipe, wherein the flexible conductor is adapted to provide relative axial movement between the inner pipe and the outer pipe.

20. A method as claimed in claim 19, wherein said placing on a sea floor comprise orienting the mid-line connector so that electrical couplers on the mid-line connector are toward the top, wherein said protecting an electrical connection pocket comprises inserting a dummy plug into the electrical connection pocket, and wherein said mating a cable comprises gripping the mid-line connector with interface handles on manipulator arms of a remotely operated vehicle.

* * * * *